United States Patent
Kim et al.

(10) Patent No.: US 7,321,479 B2
(45) Date of Patent: Jan. 22, 2008

(54) METHOD FOR WRITING SPIRAL REFERENCE SERVO SIGNAL IN HARD DISK DRIVE AND METHOD FOR COMPENSATING FOR TEMPERATURE

(75) Inventors: Cheol-soon Kim, Anyang-si (KR); Jun-seok Shim, Seongnam-si (KR); Sung-won Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 67 days.

(21) Appl. No.: 11/281,369

(22) Filed: Nov. 18, 2005

(65) Prior Publication Data
US 2006/0103967 A1    May 18, 2006

(30) Foreign Application Priority Data
Nov. 18, 2004   (KR)   .................... 10-2004-0094555

(51) Int. Cl.
*G11B 21/02* (2006.01)
(52) U.S. Cl. ...................................................... 360/75
(58) Field of Classification Search ...................... None
See application file for complete search history.

(56) References Cited

U.S. PATENT DOCUMENTS 6,992,851 B1 *  1/2006 Cloke .......................... 360/75
6,992,852 B1 *  1/2006 Ying et al. ..................... 360/75
7,123,433 B1 * 10/2006 Melrose et al. .......... 360/77.04
7,145,744 B1 * 12/2006 Clawson et al. .............. 360/75

FOREIGN PATENT DOCUMENTS

| | | | |
|---|---|---|---|
| JP | 2000-222843 A | 8/2000 |
| JP | 2002-342901 A | 11/2002 |

* cited by examiner

Primary Examiner—K. Wong
(74) Attorney, Agent, or Firm—Sughrue Mion, PLLC

(57) ABSTRACT

A method for writing a spiral reference servo signal suitable for a self-servo writing method in a hard disk drive includes writing a first reference pattern in an end direction of a spiral reference servo signal writing concentrically on the disk; writing a spiral reference servo signal on a current spiral track from a reference writing start position of the current spiral track; detecting a moving angle of a head to the first reference pattern, which corresponds to a distance from the reference writing start position to a reference writing end position of the spiral reference servo signal in the case that thermal expansion of the disk does not exist; compensating for a driving speed of the head with reference to the detected moving angle of the head; and writing the spiral reference servo signal on a next spiral track at a compensated driving speed of the head.

9 Claims, 6 Drawing Sheets

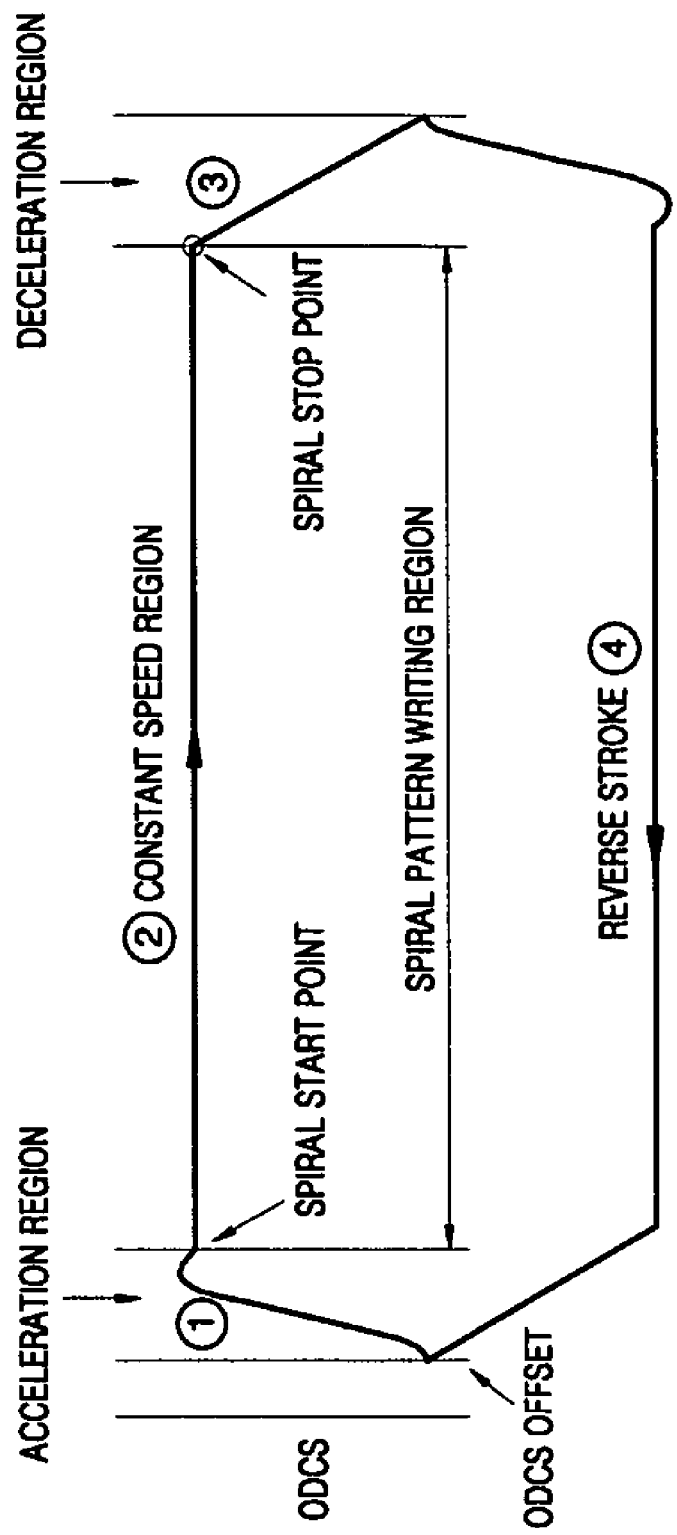

METHOD FOR WRITING SPIRAL REFERENCE SERVO SIGNAL IN HARD DISK DRIVE AND METHOD FOR COMPENSATING FOR TEMPERATURE

This application claims priority from Korean Patent Application No. 10-2004-0094555, filed on Nov. 18, 2004, in the Korean Intellectual Property Office, the disclosure of which is incorporated herein in its entirety by reference.

BACKGROUND OF THE INVENTION

1. Field of the Invention

Methods consistent with the present invention relate to writing a reference servo signal for a hard disk drive, and more particularly, to writing a spiral reference servo signal which can compensate for an error due to a thermal expansion of a disk, and to compensating for the thermal expansion of a disk due to a temperature change.

2. Description of the Related Art

In general, a hard disk drive that is one of data storage devices reproduces data written on a disk or writes user data on the disk using a magnetic head, and thus, contributes to a computer system operation. As the hard disk drive becomes compact with high capacity and high density, a bit per inch (BPI) that is, a density in a disk rotational direction and a track per inch (TPI) that is, a density in a disk radial direction thereof increase, so that a more accurate mechanism is needed.

The hard disk drive consists of a bead disk assembly (HDA) and a printed circuit board (PCB) assembly to control the HDA. The HDA includes a head for storing and restoring information, a disk where information is written, a spindle motor for rotating the disk, an actuator arm and a voice coil motor (VCM) for moving the head, an outer disk crash stop (ODCS) and an inner disk crash stop (IDCS) for limiting a range of the actuator arm, etc.

The ODCS and the IDCS are bumper units for limiting a moving range of the actuator arm so as to prevent the head from moving to a position on the disk where servo information is not written.

To control the position of the head, servo information (position information) is written for each track. As the writing density of the hard disk drive increases, the number of tracks increases, thereby a portion of a time needed for writing the servo information on the disk gradually increases relative to the entire process.

A conventional servo writing method for writing servo information on the disk of the hard disk drive uses a highly accurate encoding system and a mechanical push pin. In this system, one end of the mechanical push pin is attached to a master actuator arm and the other end thereof is extended inside the hard disk drive through a servo write slot. The master actuator arm is controlled by a positioner of a high precision. In addition, a clock head is controlled to write a clock track that contributes as a timing reference during a servo writing process, on the disk.

In the above process, a non-repeatable run-out (NRRO), a disk flutter, a motor rocking, etc. may deteriorate the accuracy in position controlling. Furthermore, the use of the positioner and the encoder greatly increases costs related to the servo writing process, so that efficiency in production of the hard disk drive is deteriorated.

To overcome the above problems, an off-line servo writing method and a self-servo writing method have been developed.

In the off-line servo writing method, servo information is written to one or more disks using a servo track writing apparatus before the disks are installed on a hard disk drive. The method can improve accuracy compared to the conventional servo writing method.

In the self-servo writing method, final servo information is written to the disk based on the previously written reference servo information. According to this method, the quality of the final servo information is determined by the accuracy of the reference servo information. Also, since this method is hardly dependent on a servo writing apparatus, process cost is reduced.

For writing the reference servo information in the self-servo writing method, there are a three-burst method and a spiral method. In the three-burst method, three kinds of burst signals (reference servo signals) are written in a width wider than a final track width and the final servo signal is written according to the reference servo signal. In the spiral method, the reference servo signals are written in a spiral shape and the final servo signal is written based on the spiral reference servo signals. U.S. Pat. No. 5,668,679 (issued on Sep. 16, 1997) discloses the above spiral method.

FIG. 1 shows a conventional method for writing a spiral reference servo signal, which is disclosed in U.S. Pat. No. 5,668,679. Referring to FIG. 1, a disk 11 is installed on a rotatable spindle motor (not shown). A read/write head 12 is attached to an actuator arm 13 capable of adjusting a position of the read/write head 12. Reference numerals 17 and 18 denote two crash stops and reference numeral 14 denotes a voice coil motor. When the voice coil motor 14 is actuated so that the actuator 13 is moved with respect to the disk 11, the head 12 is positioned to an arbitrary position between positions R1 and R2 on the disk 11. R1 and R2 denote reference tracks located at arbitrarily different positions on the disk 11. If the head 12 moves across the disk 11 between the reference tracks R1 and R2 on the disk 11 at a constant speed and simultaneously writes a signal on the disk 11, the spiral reference servo signal 100 is written in a spiral shape as indicated in FIG. 1.

FIG. 2 shows the spiral reference servo signal written by the method shown in FIG. 1. The spiral reference servo signal is written at least as many times as the number of sectors, typically, twice the number of sectors. Reference tracks R1 and R2 indicate an outer circumferential limit and an inner circumferential limit on the disk 11. A clock signal 202 indicates an interval for writing the spiral reference servo signal. A trajectory in which the spiral reference servo signal is written is referred to as a spiral track 204. The spiral reference servo signal is a signal in which a plurality of bits are arranged as shown in the left side of FIG. 2 and has sync bits 206 arranged at a predetermined interval.

A process of writing the final servo signal with reference to the spiral reference servo signal is referred to as a servo copy process. In the servo copy process, final servo signals are written on tracks having a concentric shape formed with respect to the sync bits 206. Thus, the accuracy of the bit signals 206 must be strictly managed in writing the spiral reference servo signal. However, in writing the spiral reference servo signal, as the temperature of the disk 11 increases, a difference in temperature between an initial writing state and a final writing state exists accordingly.

Since the disk 11 is expanded by heat increase, the length of a spiral track gradually increases further as a writing time passes. When the head 12 moves in a radial direction at a constant speed from the initial writing state to the final writing state without considering the thermal expansion of the disk 11, sync between the spiral tracks that is, sync between the bit signals (206), is distorted.

FIG. 3 shows a state of the reference servo signal affected by the thermal expansion of the disk. In FIG. 3, an upper spiral track corresponds to a state in which the temperature is low, for example, in the initial writing state, while a middle spiral track corresponds to a state in which the temperature is high, for example, in the final writing state. When the temperature is high, the length of the spiral track increases as compared to a case in which the temperature is low, due to the expansion of the disk 11 in a radial direction thereof.

In both cases, when the writing speed of the spiral reference servo signal is identical, sync of the spiral reference servo signal written on the spiral track is maintained at the time of writing (C1=C2). However, as the temperature decreases, the expanded spiral track contracts as shown in a lower spiral track of FIG. 3, so that the sync of the spiral reference servo signal is distorted (C1≠C3).

The upper and lower spiral tracks of FIG. 3 correspond to an initially written spiral track and a finally written spiral track, respectively, on a reference disk to be used in a servo copy process. As a result, the servo copy process is performed based on the spiral reference servo signal having a broken sync, so that a correct final servo signal is hard to obtain.

SUMMARY OF THE INVENTION

The present invention provides a method for writing a spiral reference servo signal, by which an error due to a thermal expansion of a disk is compensated for in writing the spiral reference servo signal suitable for self-servo writing on the disk of a hard disk drive.

The present invention provides a method for compensating for a thermal expansion of a disk, by which an error due to a temperature change is compensated for in writing a spiral reference servo signal suitable for self-servo writing on the disk of a hard disk drive.

According to an aspect of the present invention, a method for writing a spiral reference servo signal suitable for a self-servo writing method of a hard disk drive is provided, the method comprising: writing a first reference pattern in an end direction of a spiral reference servo signal writing concentrically on the disk; writing a spiral reference servo signal on a current spiral track from a reference writing start position of the current spiral track; detecting a moving angle of a head to the first reference pattern after the head moved over a predetermined angle, which corresponds to a distance from the reference writing start position to a reference writing end position of the spiral reference servo signal in the case that thermal expansion of the disk does not exist; compensating for a driving speed of the head with reference to the detected moving angle of the head; and writing the spiral reference servo signal on a next spiral track at a compensated driving speed of the head.

According to another aspect of the present invention, in a method for writing a spiral reference servo signal suitable for a self-servo writing of a hard disk drive on a disk on which reference patterns are written at each of inner and outer circumference, respectively, a temperature compensating method for compensating for an error due to a thermal expansion of a disk during a writing process, the temperature compensating method comprising: writing the spiral reference servo signal in a radial direction of the disk from a reference writing start position of a current spiral track; detecting a moving angle of a head to the first reference pattern in the end direction of a spiral reference servo signal writing after the head moved over a predetermined angle, which corresponds to the distance from the reference writing start position to a reference writing end position of the spiral reference servo signal in the case that thermal expansion of the disk does not exist; and compensating for a driving speed of the head with reference to the detected moving angle of the head.

BRIEF DESCRIPTION OF THE DRAWINGS

The above and other aspects of the present invention will become more apparent by describing in detail exemplary embodiments thereof with reference to the attached drawings in which:

FIG. 5 is a view illustrating a speed profile for writing the spiral reference servo signal;

DETAILED DESCRIPTION OF EXEMPLARY EMBODIMENTS OF THE INVENTION

Figure 1:
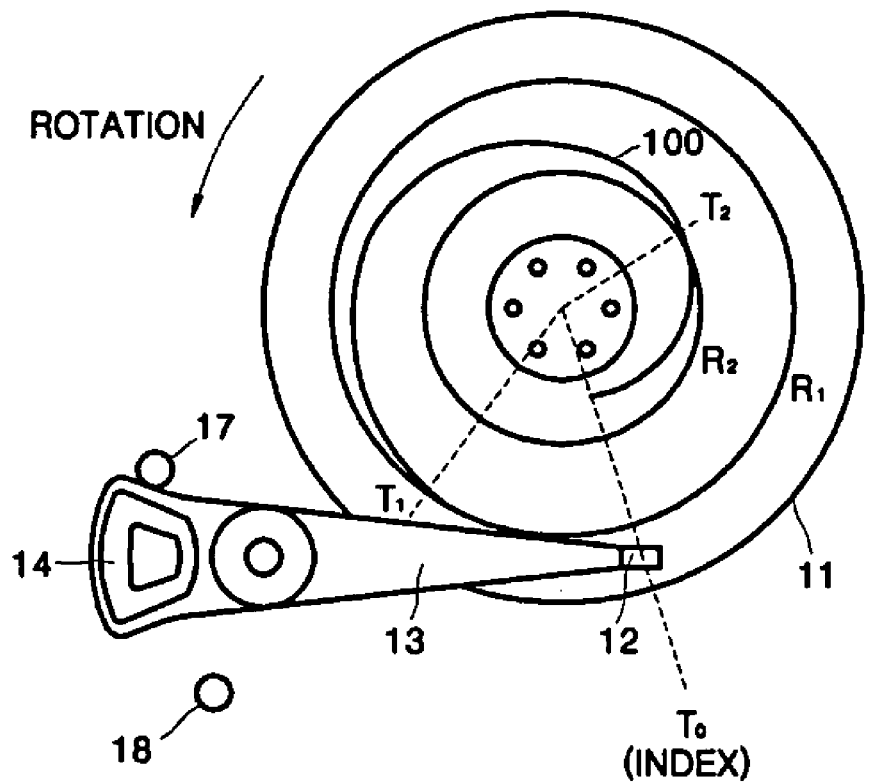
FIG. 1 is a view illustrating a conventional method for writing a spiral reference servo signal.
Figure 4:
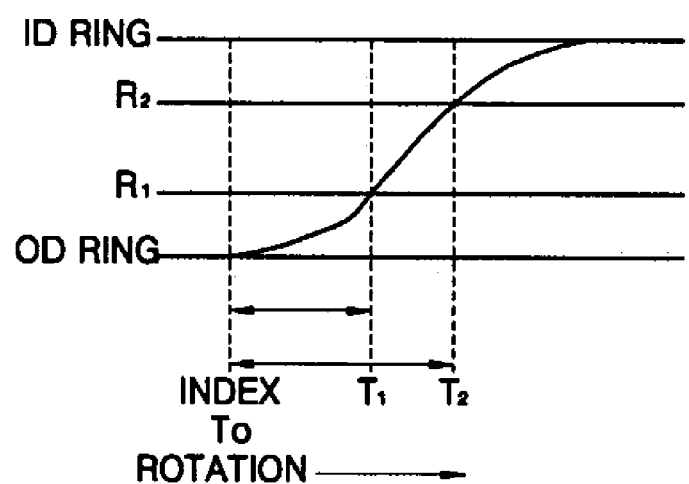
FIG. 4 is a view illustrating a method for controlling speed of a head in writing the spiral reference servo signal.

Referring to FIG. 4, the read/write head 12 (refer to FIG. 1) is driven by a push pin. The push pin is typically moved by a positioner (not shown) driven by a high precision motor or a voice coil motor. In order to maintain a constant bit interval of a spiral reference servo signal, the read/write head 12 must move at a constant speed (as shown in a particular inclination in FIG. 4) between the reference tracks R1 and R2 (refer to FIG. 1).

The read/write head 12 is driven from an index at a point T0 and has a constant speed from a point T1 when the read/write head 12 arrives at the first reference track R1. The speed is maintained until the read/write head 12 arrives at the second reference track R2. The read/write head 12 decelerates when it arrives at the second reference track R2. These operations are repeated with respect to all spiral tracks and the spiral reference servo signal is written in a section between the first and second reference tracks R1 and R2. A series of the control operations for controlling the speed of the read/write head 12 are referred to as a speed profile.

FIG. 5 is a view illustrating a speed profile for writing the spiral reference servo signal. The speed profile includes a series of processes, that is, acceleration, constant speed, deceleration, and return. The read/write head 12 is driven from a start position (offset of FIG. 5) in an acceleration region 1 and accelerated to have a particular speed at a reference writing start position T1, maintains a constant speed from the reference writing start position T1 to a spiral writing end position T2 in a constant velocity region 2, decelerated to a predetermined speed in a deceleration region 3, and returned to the original start position in a reverse stroke 4. The spiral reference servo signal is typically written in a direction from the outer circumference to the inner circumference of the disk.

Figure 6A:
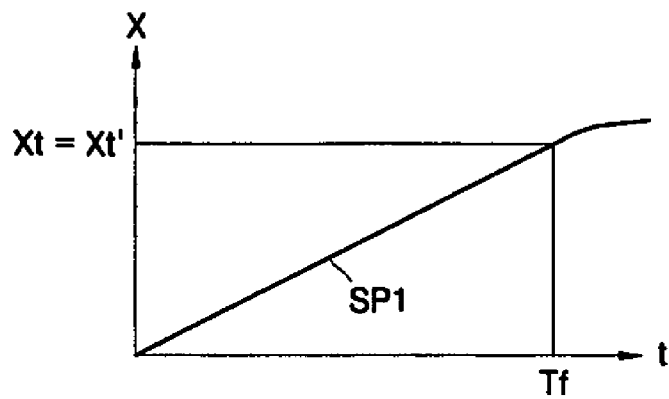
FIGS. 6A through 6C are graphs showing the principle of a method for writing the spiral reference servo signal according to an exemplary embodiment of the present invention, that is, a relationship between a speed profile and the length of a spiral track.
Figure 6B:
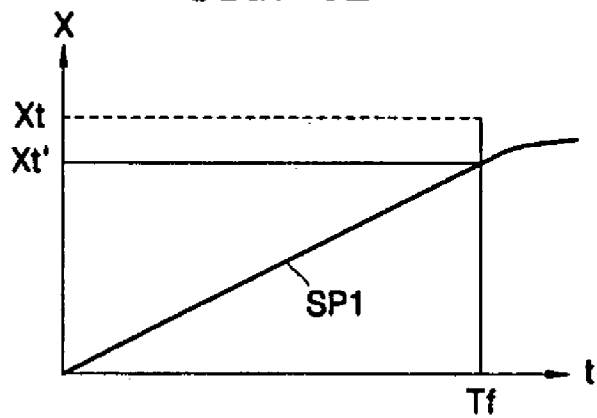
Figure 6C:
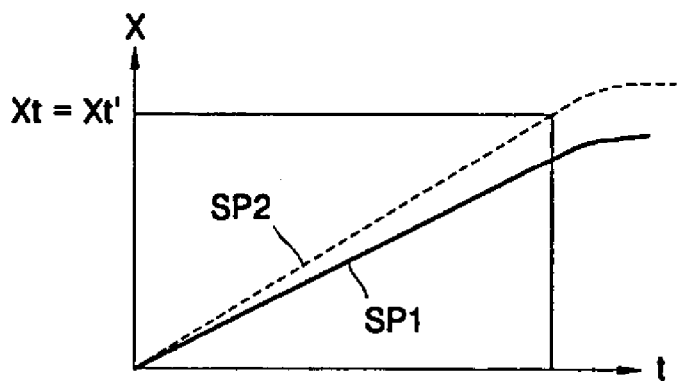

FIGS. 6A through 6C are graphs showing the principle of a method for writing a spiral reference servo signal according to an exemplary embodiment of the present invention, that is, a relationship between a speed profile and the length of a spiral track. In FIGS. 6A through 6C, the vertical axis denotes the length of the spiral track and the horizontal axis denotes a writing progress time. Xt denotes the length from the first reference track R1 to the second reference track R2. Xt' denotes a length in which the spiral reference servo signal is written when a change in temperature is not reflected, that is, at a constant speed profile.

FIG. 6A shows the initial writing state, in which the length Xt of the spiral track and the length Xt' in which the spiral reference servo signal is written are identical. FIG. 6B shows a state in which spiral writing process is performed to a certain time, that is, the disk is expanded as the temperature increases, which shows that the length Xt of the spiral track and the length Xt' in which the spiral reference servo signal is written are not identical. That is, in FIGS. 6A and 6B, when writing is performed for the same time Tf using the same speed profile SP1, the length Xt of the spiral track and the length Xt' in which the spiral reference servo signal is written are not identical.

FIG. 6C shows a case in which the length Xt' in which the spiral reference servo signal is written is extended by changing the speed profile. As shown in FIG. 6C, when the length of the spiral track increases by the increase in the temperature, it can be seen that the length Xt of the spiral track and the length Xt' in which the spiral reference servo signal is written can be made to be identical by changing the speed profile to SP2 accordingly.

Figure 7:
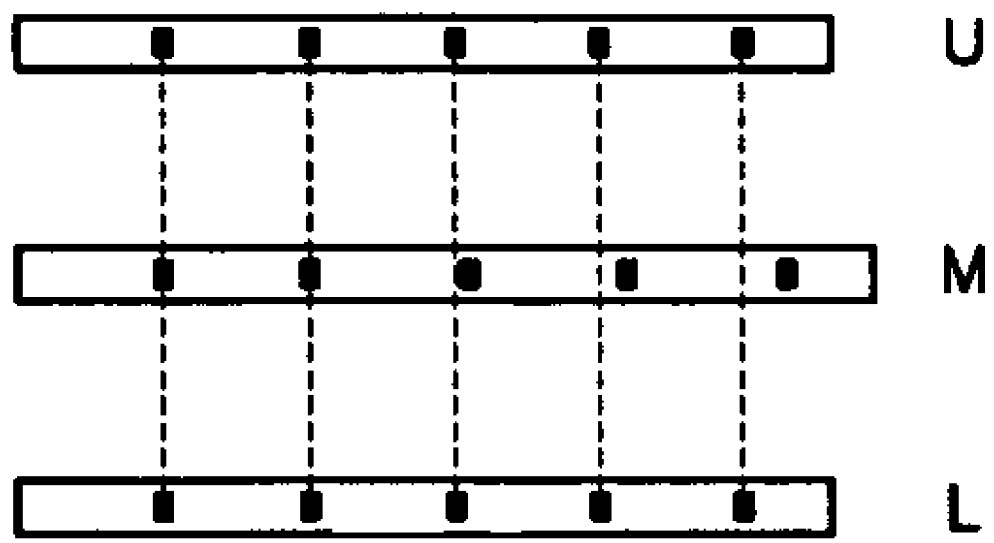
FIG. 7 is a view illustrating the principle of a method for writing the spiral reference servo signal according to another exemplary embodiment of the present invention.

FIG. 7 is a view illustrating the principle of the method for writing a spiral reference servo signal according to another exemplary embodiment of the present invention. In FIG. 7, an upper spiral track (U) is in a state in which the temperature is low, for example, at an initial writing state while a middle spiral track (M) is in a state in which the temperature is high, for example, at a final writing state.

For the middle spiral track (M), the length of the spiral track extended by an increase in temperature and the length in which the spiral reference servo signal is written can be made identical by varying the writing speed of the spiral reference servo signal.

However, when the temperature of the disk decreases, as in a lower spiral track (L) shown in FIG. 7, the length of the initially written spiral track (U) and a finally written spiral track (L) become identical and the sync of the spiral reference servo signal between two spiral tracks is matched.

If it is assumed that the expansion of the disk by the temperature is equally generated throughout the disk, since all spiral tracks change at the identical rate with respect to the change in temperature, the sync of the spiral reference servo signal is maintained. Thus, the quality of a final servo signal being written with respect to the spiral reference servo signal is stably maintained.

Figure 8:
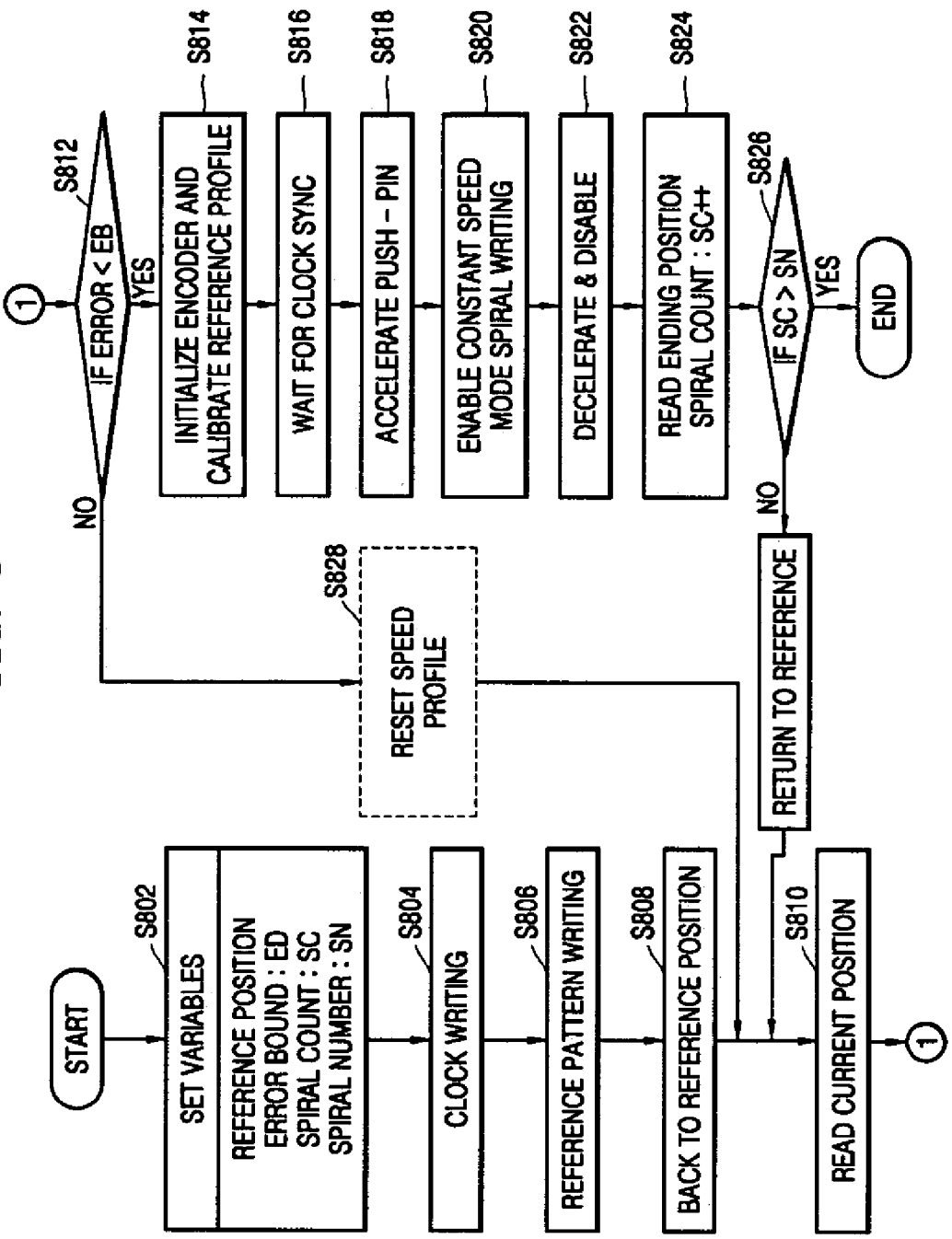
FIG. 8 is a flow chart for explaining a method for writing the spiral reference servo signal according to an exemplary embodiment of the present invention.

FIG. 8 is a flow chart for explaining a method for writing a spiral reference servo signal according to an exemplary embodiment of the present invention. Referring to FIG. 8, variables needed to control the speed profile are initialized (S802). An error bound (EB) denotes an acceptable limit of the length of the spiral track changed by the change in temperature. A spiral count (SC) denotes the number of a spiral track currently written. A spiral number (SN) denotes the total number of the spiral tracks to be written.

A clock signal is written (S804). The clock signal is concentrically written at the outer circumference or inner circumference of the disk and is a signal needed to maintain the time interval of the spiral tracks and reference servo patterns.

Reference patterns R1 and R2 are written (S806). The reference tracks R1 and R2 are used to detect a change in length of the spiral track according to the change in temperature and are written on the disk at an appropriate interval. The reference tracks R1 and R2 are written at the outer and inner circumferences of the disk, respectively. The reference patterns include a plurality of tracks and a track number is written at each track.

The head is positioned at a reference position (S808). A start position of the read/write head 12 and the actuator arm 13 is read and stored. The start position can be recognized by reading the track number of the reference pattern R1 written at the outer circumference of the disk (S810). The start position is referred to when the movement speed of the read/write head 12 is controlled by the speed profile and the length of the spiral track changed by the change in temperature is calculated.

In S812, whether the error is greater than the EB is determined. The error indicates the length of a portion of the spiral track changed by the change in temperature.

In detail, the error is obtained by producing a time after a predetermined time passes until the reference pattern R2 written at the inner circumference of the disk is detected and then calculating the produced time into a distance referring to the driving speed of the read/write head 12.

In S812, when the error is not greater than the EB, that is, when there is no error or the error is less than a specified limit, although the error exists, the process proceeds to S814 and a next spiral track is written. A speed profile previously used when the previous spiral track was written is used.

The position encoder for writing the spiral reference servo signal is initialized and the speed profile is initialized (S814). An optimal speed profile corresponding to the operation temperature of the hard disk drive is selected. Since the spiral reference servo signal is typically written in a clean room where a constant temperature state is maintained, the speed profile is selected according to the temperature of the clean room. As the spiral reference servo signal writing is progressed, the temperature of the disk gradually increases from the initial temperature due to a motor and electronics heating.

When the thermal expansion coefficient of the disk is $22.0 \times 10^{-6}$, the thermal expansion of the disk according to an increase of 4° C. in temperature of the disk having a 25 mm size is calculated as follows.

$$25 \text{ mm } (=OD-ID) \times 22.0 \times 10^{-6} \times 4° \text{ C.} = 2.2 \text{ } \mu m$$

Assuming that a track pitch is 220 nm, an error equivalent to about 10 tracks is generated when temperature changes by 4° C.

The clock signal is waited for (S816), that is, a disk circumferential position where writing of the spiral reference servo signal starts is waited for The clock signal is written concentrically at the outer circumference of the disk and used to indicate an interval at which the spiral reference servo signals are written.

Figure 2:
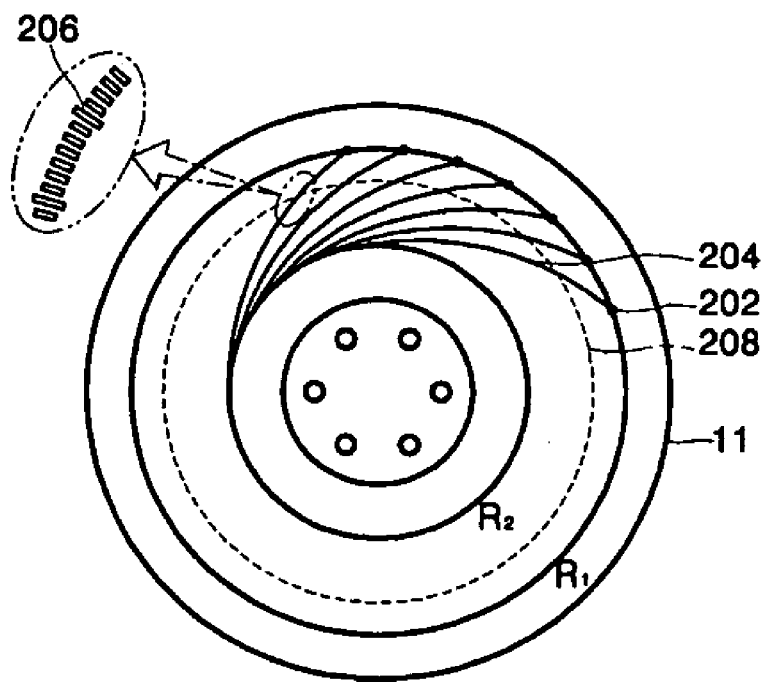
FIG. 2 is a view illustrating the spiral reference servo signal written in the method of FIG. 1.
Figure 3:
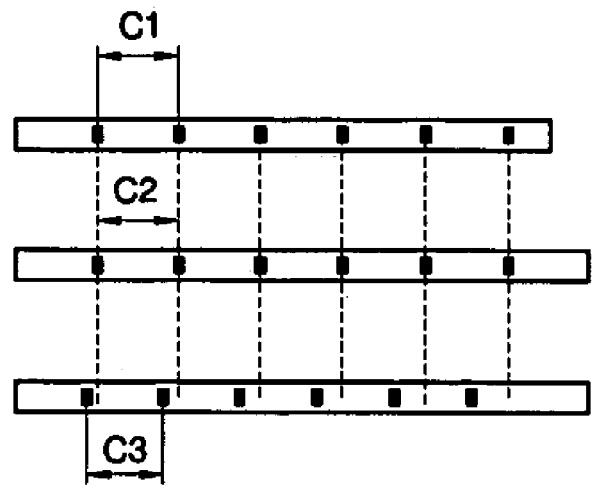
FIG. 3 is a view illustrating a state of the spiral reference servo signal affected by thermal expansion of a disk.

When the clock signal is detected, the read/write head 12 is accelerated according to the speed profile (S818). The spiral reference servo signal is written until the actuator arm 13 and, accordingly, the read/write head 12 moves over a predetermined angle. (S820) According to an exemplary embodiment of the present invention, the spiral reference servo signal is written for a predetermined time while the read/write head 12 is moved at a constant speed. Here, the predetermined time corresponds to the distance from reference writing start position to the reference writing end position of the spiral reference servo signal when thermal expansion of the disk does not exist for example, Tf shown in FIG. 6a. In this process, the spiral reference servo signal is written in a spiral shape as shown in FIG. 2.

When a reference pattern R2 in the inner circumference of the disk is detected, the read/write head 12 is decelerated to a predetermined speed (S822). In detail, the read/write head 12 is continuously driven even when a predetermined time passes, until a reference pattern R2 is detected from the inner circumference of the disk. When the reference pattern R2 is detected, the read/write head 12 is decelerated. To produce an error, the moving angle of the actuator arm after the predetermined time passes until the reference pattern of the inner circumference of the disk is detected, is detected. According to an exemplary embodiment of the present invention, the read/write head 12 is driven with a constant speed during the time until the reference pattern is detected after the predetermined time.

An ending position is read and the SC is increased by 1 (S824). The ending position can be recognized by reading the track number and the head position of the reference track R2 written at the inner circumference of the disk.

Whether the SC is greater than the SN is determined (S826). That is, whether all spiral tracks are written is checked and, if all spiral tracks are written, the spiral reference servo signal writing step is terminated. If the spiral tracks are not all written in S826, that is, if the SC is not greater than the SN, the process returns to S810.

In S812, when the error is greater than the EB, that is, when the error is greater than a limit that is allowable, the process proceeds to S828 and returns to S814 via S810 after correcting the speed profile as shown in FIG. 6C. In detail, the speed profile is corrected with reference to the error and the spiral reference servo signal is written according to the corrected speed profile.

In S828, the speed profile is corrected as much as the error shown in FIG. 6C. To compensate for the error, there may be a method for adjusting the rotation speed of the disk and a method for compensating for the driving speed of the read/write head. Since in the former method the angle of a spiral track is not constant due to a change in the angular speed of the disk, the latter method is used.

In detail, a driving step of the push pin for driving the actuator arm is corrected corresponding to, as much as, the error, the length driven for one interval. This is performed by adjusting the encoder interval of the driving motor for driving the push pin. Also, a bit interval of the spiral reference servo signal is adjusted.

To write the spiral reference servo signal, Korean Utility Model Publication No 87-8922 (published on 13 Jun. 1987) and Korean Patent Publication No. 2000-34856 (published on 26 Jun. 2000) disclose a driving method of the actuator arm using the push pin.

The present invention can be embodied as a method, an apparatus, and a system. When the present invention is embodied as software, the constituent elements of the present invention are code segments executing necessary jobs. The program or code segments can be stored on a processor readable medium or transmitted by a computer data signal combined with a carrier wave in a transmission medium or a communication network. The processor readable medium includes any medium capable of storing or transmitting information. For example, the processor readable medium can be an electronic circuit, a semiconductor memory device, a read only memory (ROM), a flash memory, an erasable ROM (EROM), a floppy disk, an optical disk, a hard disk, an optical fiber medium, or a wireless radio frequency (RF) network. A computer data signal includes any signal that can be propagated through the transmission medium such as an electronic network channel, an optical fiber, air, an electronic field, or an RF network.

While this invention has been particularly shown and described with reference to exemplary embodiments thereof, it will be understood by those skilled in the art that various changes in form and details may be made therein without departing from the spirit and scope of the invention as defined by the appended claims.

As described above, the method for writing the spiral reference servo signal according to the present invention, an accurate spiral reference servo signal is written by compensating for an error due to the expansion of the disk according to an increase in temperature in writing the spiral reference servo signal, by correcting the speed profile.

What is claimed is:

1. A method for writing a spiral reference servo signal suitable for a self-servo writing method in a hard disk drive, the method comprising:
    writing a first reference pattern in an end direction of a spiral reference servo signal writing concentrically on the disk;
    writing a spiral reference servo signal on a current spiral track from a reference writing start position of the current spiral track;
    detecting a moving angle of a head to the first reference pattern after the head moved over a predetermined angle, which corresponds to a distance from the reference writing start position to a reference writing end position of the spiral reference servo signal in a case that thermal expansion of the disk does not exist;
    compensating for a driving speed of the head with reference to the detected moving angle of the head; and
    writing the spiral reference servo signal on a next spiral track at a compensated driving speed of the head.

2. The method as claimed in claim 1, wherein the first reference pattern includes a plurality of reference tracks and each of the reference tracks has at least a track number.

3. The method as claimed in claim 1, further comprising:
    writing a second reference pattern concentrically in a start direction of the spiral reference servo signal writing on the disk; and
    determining a reference writing start position of the spiral reference servo signal with respect to the second reference pattern.

4. The method as claimed in claim 3, wherein the second reference pattern includes a plurality of reference tracks and each of the reference tracks has at least a track number.

5. The method as claimed in claim 1, wherein the head is driven by a push pin which is driven by a high precision motor or a high precision voice coil motor.

6. The method as claimed in claim 1, wherein the head is driven with a constant speed from the reference writing start position to the first reference pattern.

7. A method for writing a spiral reference servo signal suitable for a self-servo writing method in a radial direction of a disk in a hard disk drive, the method comprising:

reading a reference writing start position of the spiral reference servo signal;

detecting a moving angle of a head from the reference writing start position to a first reference pattern, which is written in the end direction of a spiral reference servo signal writing;

producing an error due to a thermal expansion of the disk with reference to the reference writing start position and the moving angle of the head;

compensating for a driving speed of the head by applying a produced error; and writing the spiral reference servo signal at a compensated driving speed of the head.

8. In a method for writing a spiral reference servo signal suitable for a self-servo writing of a hard disk drive on a disk on which reference patterns are written at each of inner and outer circumferences, respectively, a temperature compensating method for compensating for an error due to a thermal expansion of a disk during a writing process, the temperature compensating method comprising:

writing the spiral reference servo signal in a radial direction of the disk from a reference writing start position of a current spiral track;

detecting a moving angle of a head to the first reference pattern in an end direction of a spiral reference servo signal writing after the head moved over a predetermined angle, which corresponds to the distance from the reference writing start position to a reference writing end position of the spiral reference servo signal in a case that thermal expansion of the disk does not exist; and compensating for a driving speed of the head with reference to the detected moving angle of the head.

9. The method as claimed in claim 8, further comprising determining a reference writing start position of the spiral reference servo signal with respect to a second reference pattern existing in a start direction of a spiral reference servo signal writing on the disk.

* * * * *